(12) United States Patent
Oneufer et al.

(10) Patent No.: US 9,337,629 B2
(45) Date of Patent: May 10, 2016

(54) COMPACT DUAL FEEDERS FOR CIRCUIT BREAKERS AND RELATED BUCKETS AND MOTOR CONTROL CENTERS (MCCS)

(71) Applicant: Eaton Corporation, Cleveland, OH (US)

(72) Inventors: Stephen William Oneufer, Fayetteville, NC (US); Robert Allan Morris, Fayetteville, NC (US); Daniel Boyd Kroushl, Clayton, NC (US)

(73) Assignee: Eaton Corporation, Cleveland, OK (US)

( * ) Notice: Subject to any disclaimer, the term of this patent is extended or adjusted under 35 U.S.C. 154(b) by 13 days.

(21) Appl. No.: 14/535,447

(22) Filed: Nov. 7, 2014

(65) Prior Publication Data

US 2015/0255966 A1   Sep. 10, 2015

Related U.S. Application Data

(60) Provisional application No. 61/948,867, filed on Mar. 6, 2014.

(51) Int. Cl.
| | | |
|---|---|---|
| *H02B 1/48* | (2006.01) | |
| *H02B 1/32* | (2006.01) | |
| *H02B 1/36* | (2006.01) | |

(52) U.S. Cl.
CPC .. *H02B 1/48* (2013.01); *H02B 1/32* (2013.01); *H02B 1/36* (2013.01)

(58) Field of Classification Search
CPC ............... H02B 1/48; H02B 1/32; H02B 1/42
See application file for complete search history.

(56) References Cited

U.S. PATENT DOCUMENTS

| | | | | |
|---|---|---|---|---|
| 3,217,090 | A * | 11/1965 | Stegmaier | H02B 1/42 174/72 B |
| 4,024,441 | A | 5/1977 | Coyle et al. | |
| 4,472,761 | A * | 9/1984 | Koslosky | H02B 1/21 361/638 |
| 4,503,408 | A | 3/1985 | Mrenna et al. | |
| 5,910,760 | A | 6/1999 | Malingowski et al. | |
| 6,194,983 | B1 | 2/2001 | Bogdon et al. | |
| 7,186,933 | B2 | 3/2007 | Turner | |
| 8,927,888 | B2 * | 1/2015 | Reid | H01H 9/26 200/50.32 |
| 2013/0077210 | A1 | 3/2013 | Morris | |
| 2015/0103472 | A1 * | 4/2015 | Oneufer | H01H 71/56 361/605 |
| 2015/0380910 | A1 * | 12/2015 | Oneufer | H02B 1/46 361/622 |

OTHER PUBLICATIONS

MNS-MCC Low Voltage Motor Control Center Installation Manual, ABB Inc. Low Voltage Products & Systems, 2012, 44 pages.

* cited by examiner

*Primary Examiner* — Gregory Thompson
(74) *Attorney, Agent, or Firm* — Myers Bigel & Sibley, P.A.

(57) ABSTRACT

Dual starters and/or feeders are positioned in a unit housing to be offset from one another in a front to back direction to provide a compact configuration for a MCC cabinet. The dual starters or feeders can communicate with a respective external handle attached to an inwardly oriented shaft. The handles can be rotary handles that connect to a respective gear assembly that transforms rotational input to linear input.

20 Claims, 16 Drawing Sheets

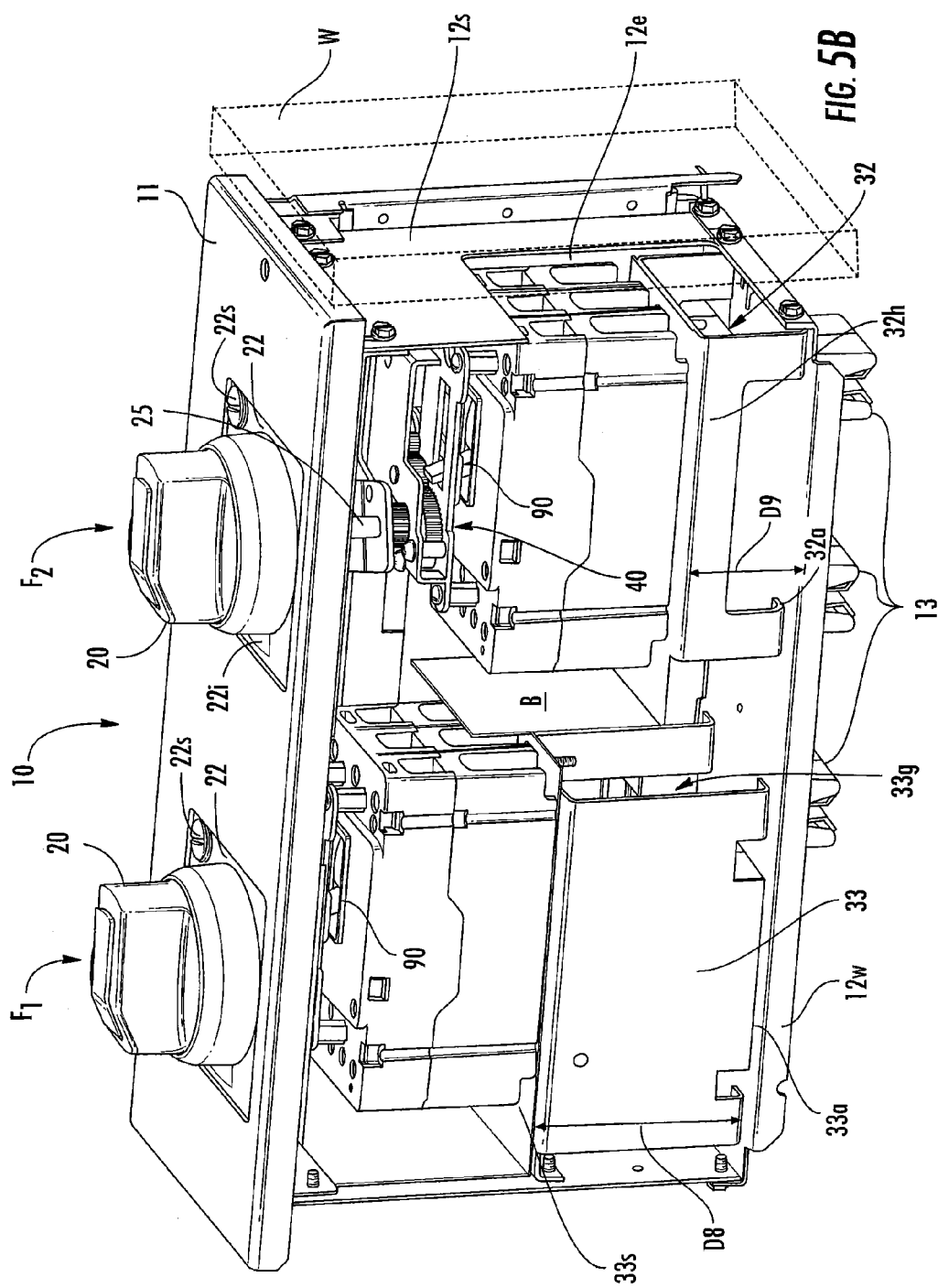

COMPACT DUAL FEEDERS FOR CIRCUIT BREAKERS AND RELATED BUCKETS AND MOTOR CONTROL CENTERS (MCCS)

RELATED APPLICATIONS

This application claims the benefit of and priority to U.S. Provisional Application Ser. No. 61/948,867, filed Mar. 6, 2014, the contents of which are hereby incorporated by reference as if recited in full herein.

FIELD OF THE INVENTION

The present invention relates to motor control center units.

BACKGROUND OF THE INVENTION

As is known to those of skill in the art, Motor Control Centers (MCC) can include cabinets or enclosures that hold multiple, typically modular, bucket assemblies or units of various sizes. See, e.g., U.S. Pat. No. 4,024,441, the contents of which are hereby incorporated by reference as if recited in full herein. Eaton Corporation has recently introduced a MCC product line with compact bucket assemblies that conveniently plug into a slot or space in an MCC cabinet. The product is sold under the product name, Freedom 2100 MCC. See also, U.S. Patent Application Publication Serial Number US2013/0077210, the contents of which are hereby incorporated by reference as if recited in full herein.

The bucket assemblies (also known as "buckets" or "units") can include handles that are disposed on the front door. The handle can be a rotary handle configured to convert the rotary motion of the rotary handle to the linear or translational motion of a circuit breaker linear action lever. See, e.g., U.S. Pat. Nos. 6,194,983 and 7,186,933, the contents of which are incorporated by reference as if recited in full herein. The handle is typically mounted parallel with the plane of the faceplate of the molded case circuit breaker, but spaced outwardly from it by the depth of the handle mechanism. Usually, a series of linkages are utilized to interconnect the rotary motion of the rotary handle to the linear motion of the circuit breaker handle or lever.

Despite the above, there remains a need for alternate bucket assembly configurations.

SUMMARY OF EMBODIMENTS OF THE INVENTION

Embodiments of the invention provide compact dual feeders for bucket assemblies.

Embodiments of the invention are directed to bucket assemblies that include: (a) a unit housing having a front; (b) a first external handle facing the front of the housing and attached to a first inwardly extending shaft; (c) a second external handle facing the front of the housing and attached to a second inwardly extending shaft and being laterally spaced apart from the first external handle; (d) a first feeder held in the unit housing in communication with the first handle; and (e) a second feeder held in the unit housing in communication with the second handle. The first feeder is held in the unit housing adjacent to but offset from the second feeder, in a front to back direction, to reside closer to the front of the unit housing than the second feeder.

The first and second feeders can be right and left side feeders that have primary bodies that reside laterally spaced apart a distance of between about 1-3 inches, measured from adjacent inwardly facing sides extending in the front to back direction.

The first and second feeders can have primary bodies that reside spaced apart in the front to back direction so that a rear surface of one is a distance of between about 1-3 inches from a front surface of the other.

The first feeder can be a right side feeder and the second feeder can be a left side feeder. The unit housing can have a right sidewall that has an open portion allowing an exit access path for conductors from the first and second feeders to a right side vertical wireway.

The first feeder can be a right side feeder and the second feeder can be a left side feeder. The left side feeder can reside closer to the front of the unit housing than the right side feeder. The first shaft of the (first) right side feeder can have a length that is between about 1.5 times to about 5 times greater than that of the left side feeder.

The bucket assembly can include a terminal block residing in the unit housing adjacent a side of a primary body of the first feeder.

The first and second feeders can have respective primary bodies of substantially the same size and shape. The primary bodies can be laterally offset from each other a distance of between 0.5-3 inches and offset in the front to back direction between about 0.5-5 inches. The first feeder can be held by a bracket attached to a rear wall of the unit housing, the bracket defining a wireway space extending laterally behind the first feeder primary body. The terminal block can reside adjacent to but behind the first feeder in line with the bracket wireway.

Both offsets can be between about 1-3 inches.

The bucket assembly may include pre-installed conductors attached to the second feeder and extending to the terminal block.

The first and second feeders can have conductor connectors facing a vertical wireway. The first feeder can be held in the unit housing by a first bracket attached to a rear surface of a primary body of the first feeder. The first bracket can be configured to define an open laterally extending space behind the first feeder that defines an internal laterally extending wireway for conductors attached to the second feeder to a vertical wireway.

The handles can be external rotary handles having a defined ON position and OFF position associated with conduction and non-conduction. An inner portion of the first and second shafts can cooperably engage a respective first and second operator mechanism that engage a respective lever or switch of the circuit breaker or fuse disconnect. The first and second operator mechanisms can include a rotatable drive gear attached to the shaft that engages a rack gear that linearly moves an operator slider to move the lever or switch.

The first and second feeders may include molded case circuit breakers.

The unit housing can have a centerline that extends in the front to back direction, aligned with a center power stab extending out a back of the unit housing. The first and second feeders can have primary bodies arranged so that one resides in a right side and one that resides in a left side of the unit housing and so that an inward facing wall of the right side primary body resides closer to the center power stab than an inward facing wall of the left side primary body.

The first feeder can be a left side feeder and the second feeder can be a right side feeder and each feeder can have respective primary feeder bodies. The first and second handles can be rotatable handles. The second shaft can be longer than the first shaft and the right side feeder can reside further away from the front of the unit housing than the left side feeder. The bucket can also include a first bracket attached to a back of the unit housing and the primary body of the first feeder and a second bracket attached to the back of the unit housing and the primary body of the second feeder. The second bracket can define a laterally extending wireway space in the unit housing extending behind the second feeder for conductors attached to the primary body of the first feeder to a right side vertical wireway. The second bracket can have a smaller depth dimension in the front to back direction than the first bracket.

Other embodiments are directed to compact dual feeder bucket assemblies. The assemblies include: (a) a unit housing; (b) right and left side molded case circuit breakers that have substantially the same size and shape; (c) right and left side external handles that are aligned and held by the unit housing that translate based on conduction and non-conduction status of a respective breaker in the unit housing, and (d) first and second inwardly extending shafts, the first shaft attached to the right side handle and the second shaft attached to the left side handle. One shaft is longer than the other shaft by between about 1.5 times (1.5×) to about five times (5×), e.g., about two times (2×), about 3× or about 4×, for example.

The right side and left side circuit breakers can have a lever facing a front of the unit housing. The right side circuit breaker can reside closer to the front of the unit housing than the left side circuit breaker.

Conductors from the left side circuit breaker can travel straight across the unit housing behind the right side circuit breaker to a right side vertical wireway.

The right side and left side circuit breakers can have a lever facing a front of the unit housing. The left side circuit breaker can reside closer to the front of the unit housing than the right side circuit breaker.

Conductors from the left side circuit breaker can bend to travel behind the right side circuit breaker to a right side vertical wireway.

Still other embodiments are directed to a motor control center (MCC) cabinet with vertically stacked bucket units. At least one bucket can have first and second external rotary handles with a respective first and second inwardly extending shaft attached to a respective fuse disconnect or circuit breaker. The first shaft can be between two times and five times longer than the second shaft. The fuse disconnect can be held in the unit housing adjacent to but offset from the circuit breaker, in a front to back direction, to reside closer to a front of the bucket than the second feeder.

The cabinet includes a right side vertical wireway. Conductors from the left side circuit breaker can travel in front of or behind the right side circuit breaker to the right side vertical wireway.

The bucket assemblies can have a substantially constant width irrespective of height and the height or frame size of the bucket assemblies can be in 6 inch increments of between about 6 inches to about 72 inches.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 5B is a side perspective view of the unit shown in FIG. 5A according to embodiments of the present invention.

DETAILED DESCRIPTION OF EMBODIMENTS OF THE INVENTION

Figure 1:
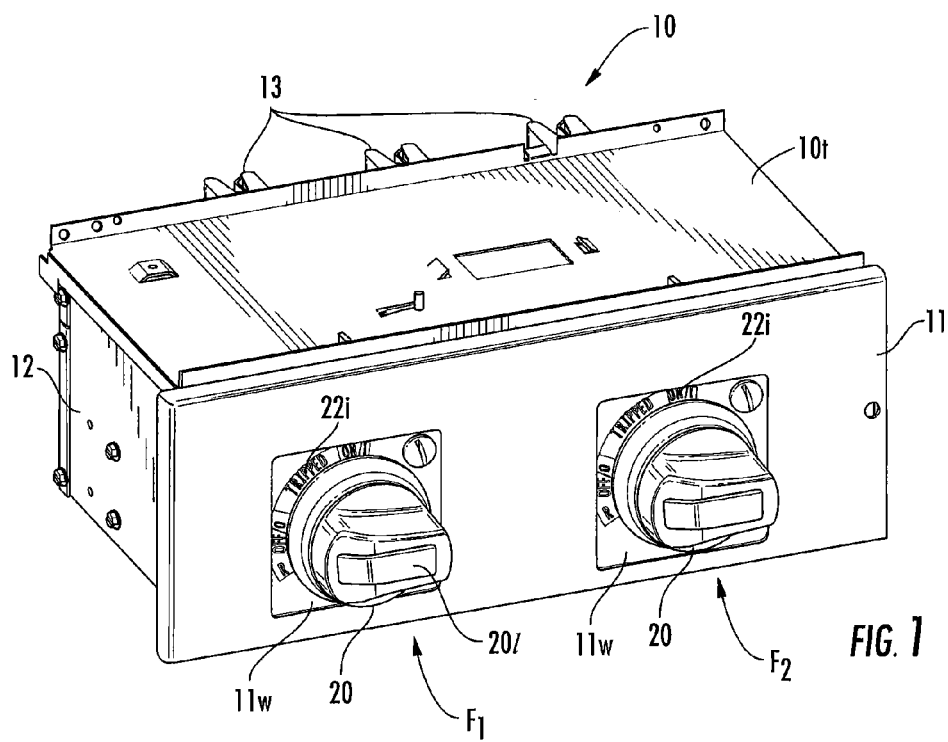
FIG. 1 is a front perspective view of an exemplary unit with a dual starter or feeder (or starter and feeder) configuration according to embodiments of the present invention.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10'").

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

In the present disclosure, the terms "bucket" or "unit" are used interchangeably and are intended to mean a motor control center unit that may be configured to be a removable modular unit capable of being installed behind individual or combined sealed doors on the motor control center enclosure. The unit may contain various motor control and motor protection components such as motor controllers, starters, contactor assemblies, overload relays, circuit breakers, motor circuit protectors, various disconnects, and similar devices for electric motors. The unit is configured to connect to a common power bus of the motor control center and conduct supply power to the line side of the motor control devices for operation of motors or feeder circuits.

As discussed before, units may be configured as "starter units" for supplying power controlling electrical motors and pumps or as general "feeder units" for supplying feeder circuits. The terms "bucket assembly", bucket" and "unit" are used interchangeably and refer to a metal structure (typically having sides of a protective metal shell) that contains either a fuse or a circuit breaker for turning power ON and OFF to a motor, or feeder circuit, typically for controlling power to motor starters. As noted above, the bucket or unit can be a feeder unit or a starter unit. The bucket can include other components such as a power transformer, a motor starter to control a single motor and PLCs (programmable logic controllers), drives and the like. The bucket can be configured as a modular device to allow the internal components to be assembled as a unit that can be easily installed into a Motor Control Center (MCC) compartment. As is well known, the bucket can have a bus grid with "power stabs" 13 (FIG. 1) in the back that connect to (vertical) bus bars that carry power (current) to the compartments of a vertical section in an MCC cabinet. The vertical bus bars are connected to the larger horizontal bus bars that bring power to the vertical sections. The horizontal bus bars are usually in the top, but some MCC designs may have them in the center or bottom.

A "feeder unit" refers to a motor control center unit for supplying feeder circuits. A feeder unit may have one or more feeders or power supply lines to supply feeder circuits or devices. A feeder unit (also called a "feeder") can have a "line side", which refers to the side of the feeder configured to be directly or indirectly connected to the common power bus of the motor control center. A feeder can also have a "load side", which refers to the side of the feeder configured to be connected to and deliver current to a feeder circuit. A feeder may comprise a circuit breaker, a fuse and disconnect switch, or another configuration. The terms "feeder circuit" and "feeder device" are used interchangeably and are intended to mean circuits or devices connected to feeder units or "feeders".

A "circuit breaker", "breaker", "molded case circuit breaker", or "MCCB" is a device designed to open and close a circuit, typically allowing both manual open and close operation and automatic circuit operation, the latter to open a circuit based on a set value, e.g., an over-current, without damaging itself when properly applied within its current rating. The circuit breaker can be for a motor starter unit or feeder unit, for example.

The terms "motor", "load", and "load device" are used interchangeably and are intended to mean devices bearing electrical load that are connected to and controlled by the motor control center. Load devices are typically motors but may also be pumps or other machinery that may comprise motors or pumps. Load devices may be connected to starter units.

The terms "operating mechanism" and "operator mechanism" are used interchangeably and refer to an assembly for opening and closing separable main contacts in a circuit breaker or for turning power ON and OFF using a switch associated with a fuse.

MCCs usually have a wire way "W" (FIGS. 3B, 4A, 5C) for wires from respective units 10 to the motors and other loads and control wires. U.S. Patent Application Publication 2013/0077210 describes an MCC with both right and left side wireways, the contents of which are hereby incorporated by reference as if recited in full herein. The wireways W are typically provided as an enclosed space in an MCC cabinet proximate but outside stacked units. MCCs can be configured in many ways. Each compartment can have a different height to accept different frame sizes of respective bucket assemblies or units 10, typically in about 6-inch increments. The vertical bus can be omitted or not run through the full height of the section to accommodate deeper buckets for larger items like variable frequency drives. The MCC can be a modular cabinet system for powering and controlling motors or feeder circuits. Several may be powered from main switchgear which, in turn, gets its power from a transformer attached to the incoming line from the power company. A typical MCC cabinet is an enclosure with a number of small doors arranged in rows and columns along the front. The back and sides are typically flat and mostly featureless. The buckets can be provided in varying sizes. For starter units, the size can be based on the size of the motor they are controlling. The bucket assembly can be configured to be relatively easily removable for repair, service or replacement. MCCs can have regular starters, reversing starters, soft start, and variable frequency drives. MCCs can be configured so that sections can be added for expansion if needed.

The terms "right side" and "left side" refer when the unit or MCC is viewed from the front, e.g., the front is associated with the panel 11 with handles 20 as shown in FIG. 1. While the handles 20 are shown as rotary handles, other handle configurations may be used, including, for example, push handles, levers and linearly moveable handles.

The term "compact" refers to units 10 held in a condensed configuration (package) relative to conventional units/buckets. The MCC structure or cabinet 100 (FIG. 13) can be designed to receive multiple bucket units 10 ranging in various defined sizes. The units 10 can be provided in package or frame sizes of about 6 inches to about 72 inches (tall) with substantially common depth and width dimensions, known as 1X (6 inches) to 12X (72 inches) sizes. The sizes can be in single X increments, from 1X, 2X, 3X, 4X, 5X, 6X, 7X, 8X, 9X, 10X, 11X and 12X. Thus, a 5X MCC unit 10 can be about 30 inches tall. The frame sizes can be provided for a plurality of amperages, including a plurality of: 125 A, 150 A, 225 A, 250 A, 400 A, 600 A, 1200 A and 2000 A, for example. A unit 10 is typically about 7 inches deep but larger or smaller sizes may be appropriate in some embodiments.

Referring now to the figures, FIGS. 1, 2A, 2B, 3A and 3B illustrate examples of a bucket assembly or unit 10. The bucket assembly 10 can be configured for DC (direct current) or AC (alternating current) operation. The bucket assembly 10 can include a front cover 11 and a top housing 10$t$. The bucket assembly can include at least one door 22 under the front cover 11. The bucket assembly 10 can have a metal outer frame or housing 12.

In some embodiments, the bucket assembly 10 can comprise a molded case circuit breaker. Molded case circuit breakers are well known to those of skill in the art, as exemplified by U.S. Pat. Nos. 4,503,408 and 5,910,760, the contents of which are incorporated herein by reference as if recited in full herein. In other embodiments, the bucket assembly 10 can be configured to house a fuse system 10$f$ (FIG. 9B) with a fuse disconnect switch to turn power on and off. In some embodiments, the MCC cabinet 100 (FIG. 13) can hold both fuse and circuit breaker type units 10 and each can have a standardized rotary handle 20 that controls the internal components for power on/off operation.

As shown in FIGS. 1, 2A, 2B, 3A and 3B, the unit 10 typically includes two side-by-side (e.g., tandem) handles 20 that individually communicate with respective internal disconnect or operator mechanisms 40, 40' that, in turn, connect to a circuit breaker 10$c$ (FIGS. 3A, 3B) or a fused disconnect switch 10$f$ (FIG. 9B), respectively. The handles 20 can be rotary handles and may optionally include a lock out lever 20L. As is well known to those of skill in the art, a lock out lever 20L has a channel that accepts an arm of a padlock to extend therethrough and allows a padlock to be attached to the handle 20 to inhibit movement of the handle to another operational state.

The unit 10 can be configured so that a left side stab 13L or right side stab 13R (and/or the center stab 13C) is closer to a respective left or right side of the unit 10, shown as at distances $X_1 > X_2$, so that the center stab 13C resides closer to the right side of the unit and/or right side housing wall 12 relative to the left side housing wall 12.

Figure 3A:
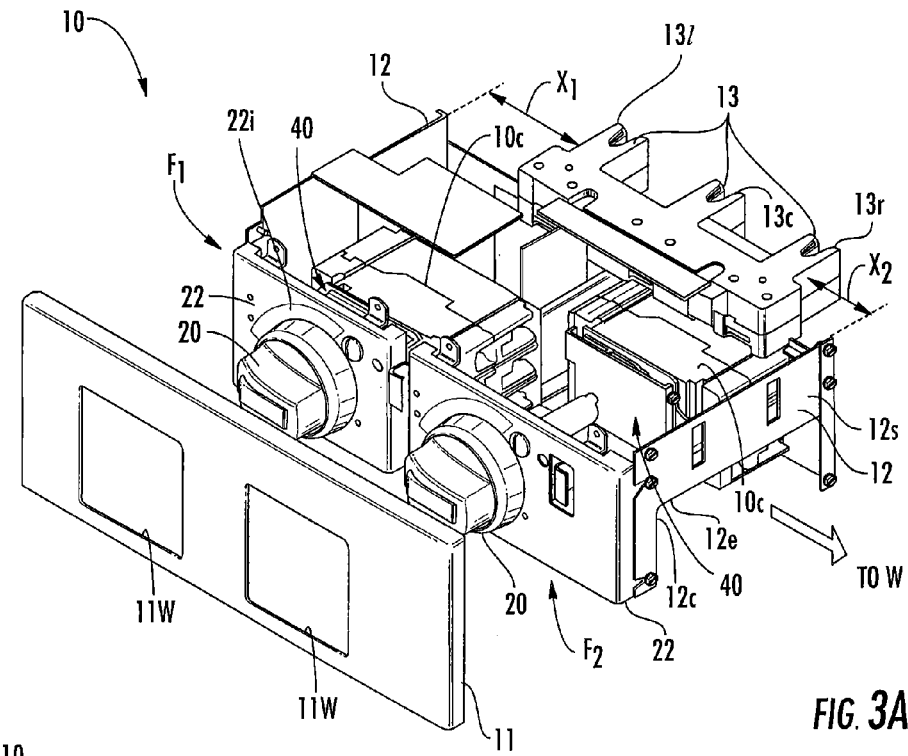
FIG. 3A is a partial exploded view of the unit shown in FIG. 2A according to embodiments of the present invention.
Figure 3B:
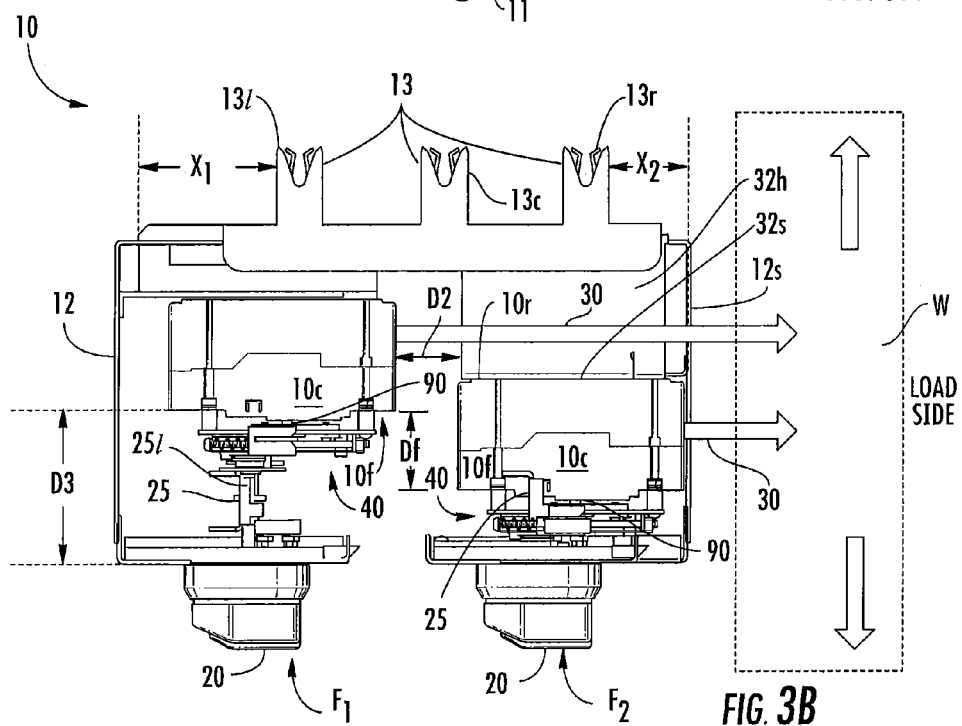
FIG. 3B is a partial top view of the unit shown in FIG. 2B according to embodiments of the present invention.
Figure 4A:
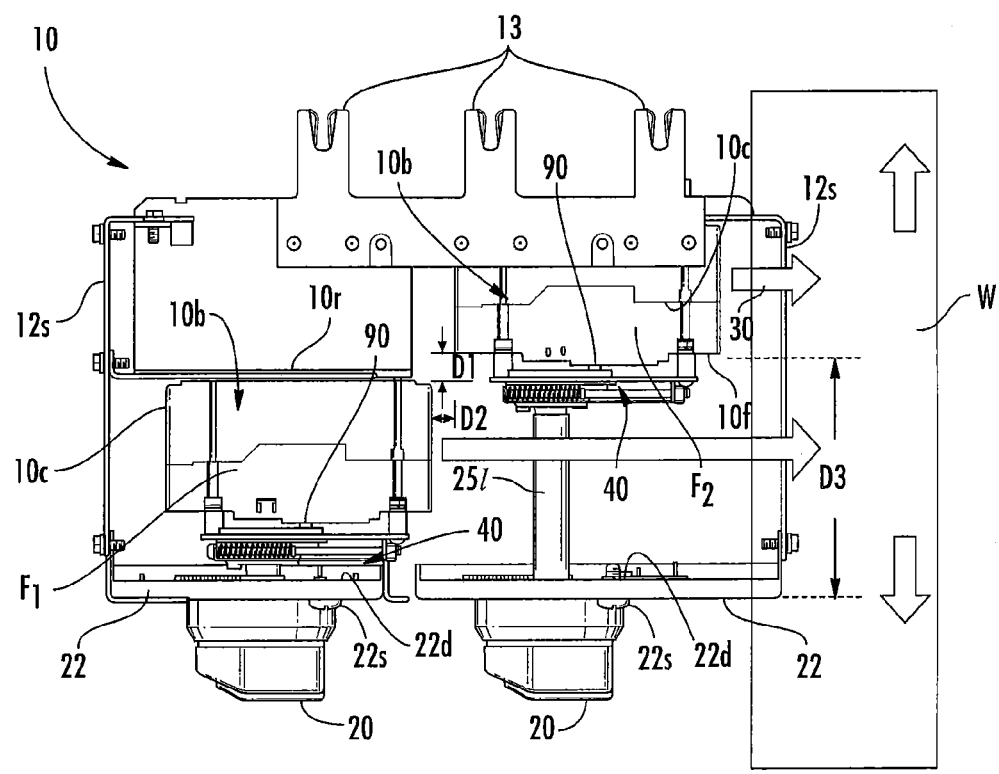
FIG. 4A is a top view of the unit shown in FIG. 3A illustrating an exemplary offset arrangement of dual starters and/or feeders inside the unit according to embodiments of the present invention.

As shown in FIGS. 3A and 3B, the unit 10 can include dual feeders $F_1$, $F_2$ that include a molded case circuit breaker (MCCB) 10$c$ that can be operated by an operating handle mechanism 40 commonly called the "op-mech" or "operator mechanism". This op-mech 40 can be configured to mount over an internal lever associated with a switch or the breaker's integral lever 90 (FIG. 3B, 4A). The op-mech 40 allows a user to operate the circuit breaker 10$c$ with the door 22 of the motor control center unit 10 closed. The doors 22 can include visual indicia 22$i$ or text that identifies an operational status by position, e.g., Reset "R", OFF, TRIPPED and ON. The TRIPPED text may be omitted for fuse systems.

It is noted that for ease of discussion, the use of two feeders in a respective unit are used by way of example. A feeder can be replaced with a starter and any unit 10 can include two starter circuits, two feeder circuits or a starter and a feeder, for example. Thus, as used herein, the designations "$F_1$" and "$F_2$" refer to the internal starter and/or feeder device.

Figure 2A:
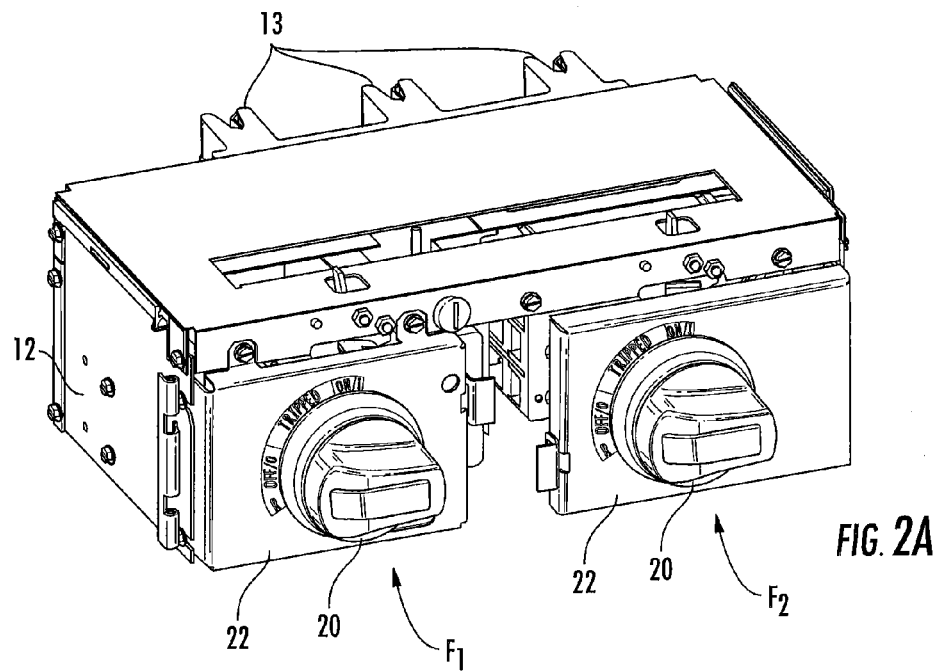
FIG. 2A is a front view perspective view of the unit shown in FIG. 1, but with the front cover and top housing member removed according to embodiments of the present invention.
Figure 2B:
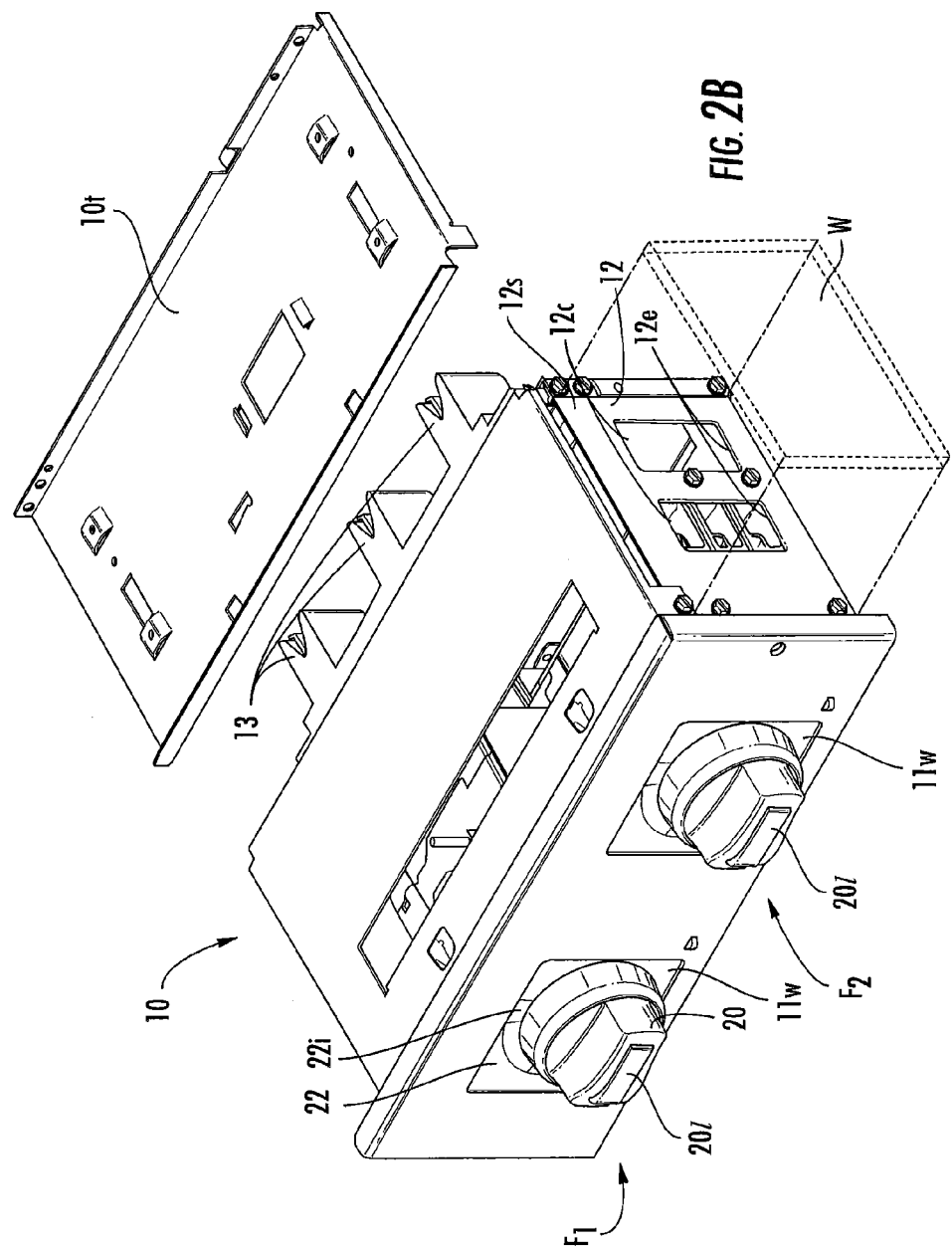
FIG. 2B is a side perspective view of the unit shown in FIG. 1, but with the top housing member in an exploded view according to embodiments of the present invention.
Figure 9A:
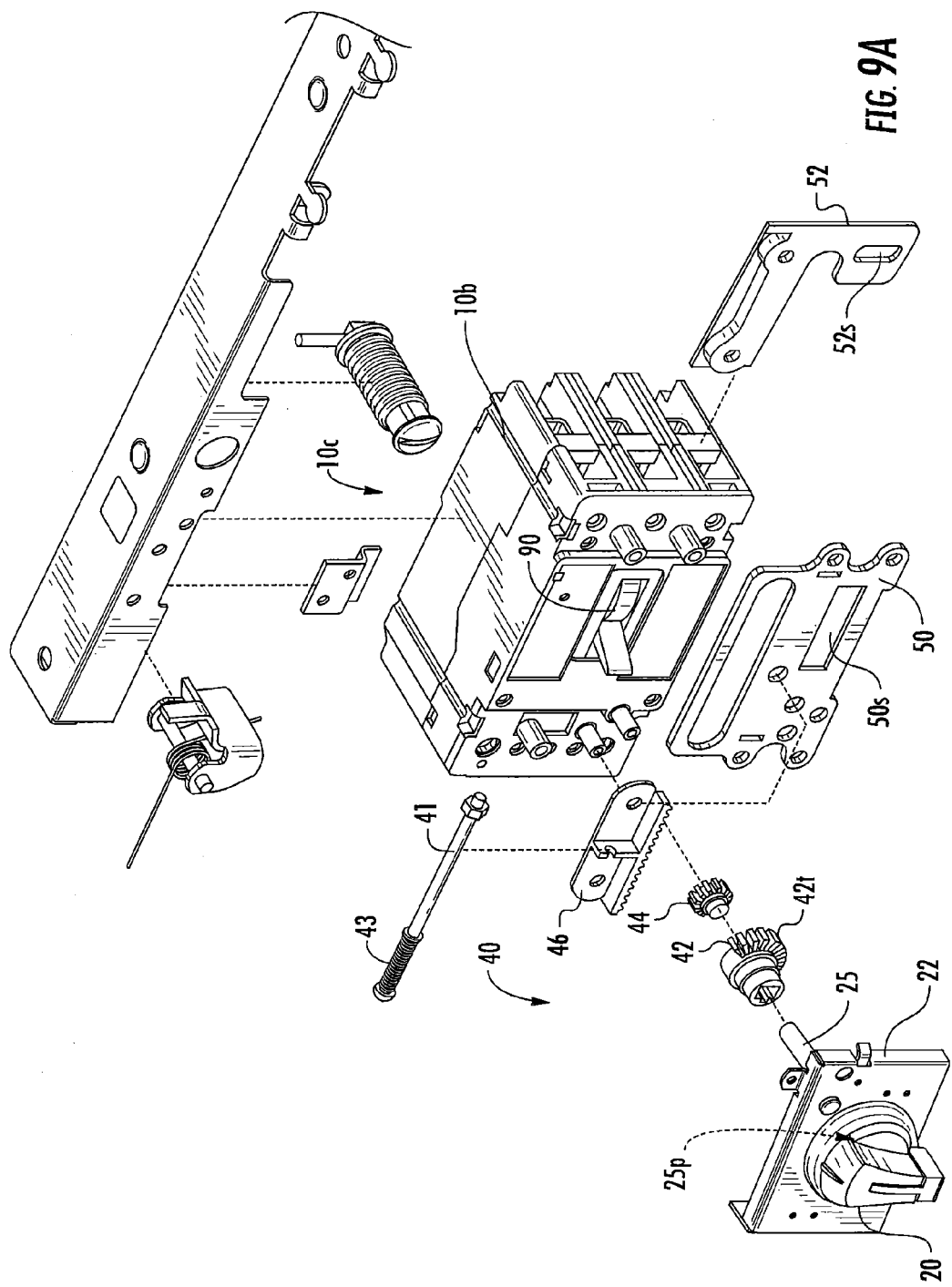
FIG. 9A is a partial exploded view of an exemplary unit illustrating components of an exemplary operator mechanism according to some embodiments of the present invention.
Figure 9B:
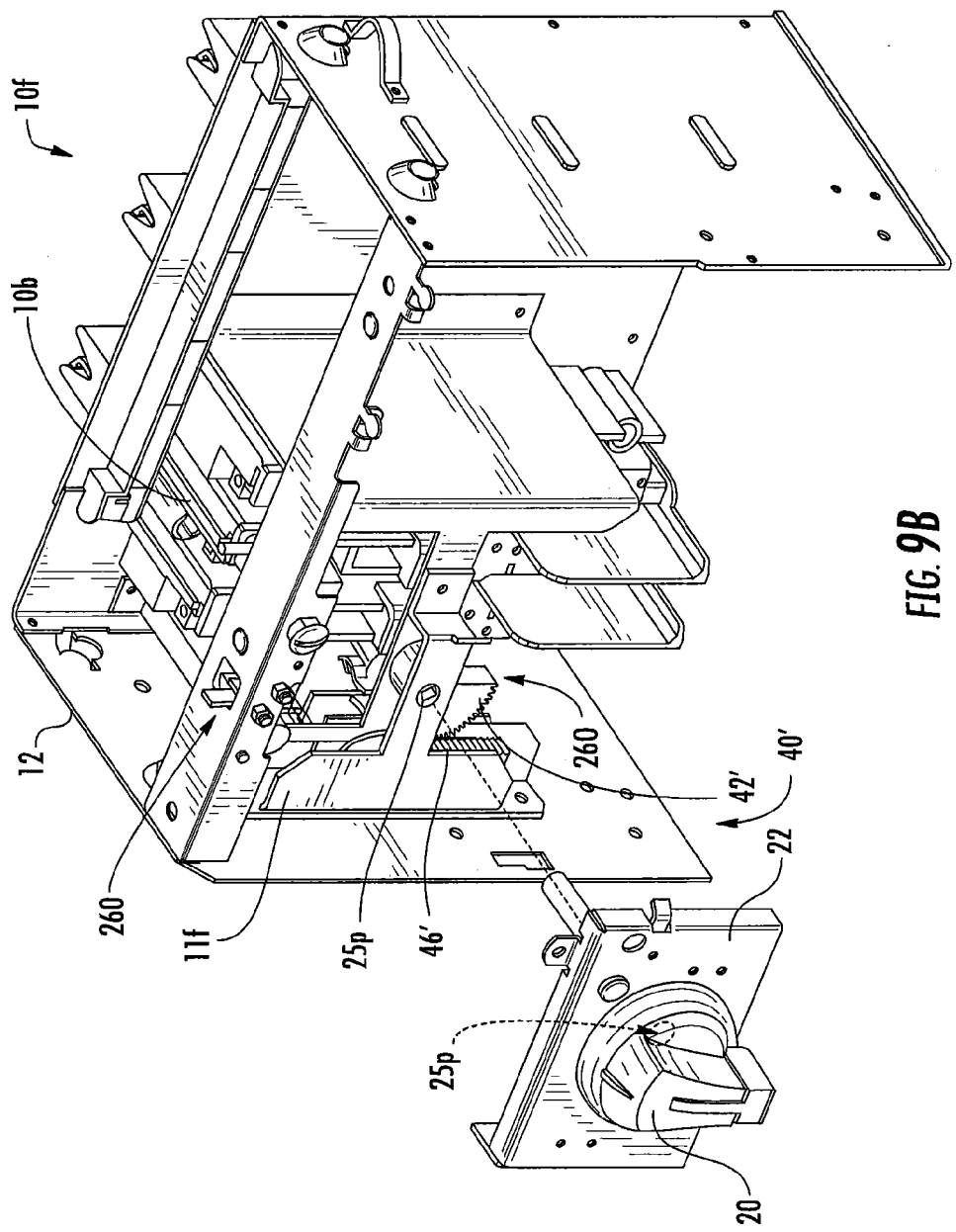
FIG. 9B is a partial exploded view of an exemplary unit illustrating components of an exemplary operator mechanism and fuse system according to some embodiments of the present invention.

As shown in FIGS. 1, 2B and 3A, the rotary handles 20 extend through a cutout 11$w$ in the cover panel 11 and an inwardly extending shaft 25 extends through a port 25$p$ in each motor control center unit door 22 (FIG. 9A). The handle 20 can have other forms as noted above, such as, but not limited to, a linear operating handle. The shaft 25 can be configured to operate an ON/OFF switch or lever 90 and FIG. 9B illustrates an example of an operator mechanism 40' modified from that of the circuit breaker op-mech 40 for a fuse disconnect.

For a circuit breaker configuration 10c, the handle 20 can move between circuit breaker conduction to circuit breaker non-conduction. Where a rotating handle is used, typically, there is about a 90° rotation from conduction to non-conduction ("OFF" to "ON") but other defined rotational stroke distances may be used including, for example, about 45 degrees, about 120 degrees, or about 180 degrees. For a fuse disconnect, a similar rotation can be used to cause the ON/OFF.

Optionally, the handle 20 can be configured to turn about 90 degrees in all different breaker sizes in a single MCC cabinet 100 (FIG. 13) that can provide standardized visual output of "on/off" and can allow for standardized components between different assemblies 10.

As is known to those of skill in the art, conductors/wires attached to the starters and/or feeders $F_1$, $F_2$ to customer (e.g., load side) connections in the wireway W can be subject to bending restraints defined by wire size to comply with industrial control guidelines such as NEC rules for both L and S bends such as UL (Underwriters Laboratories) 845. Embodiments of the invention provide units 10 with adjacent dual (e.g., independently operable but tandem) starters and/or feeders $F_1$, $F_2$ connected to respective side-by-side handles 20, with the body of one of the circuit breakers 10c and/or fused disconnect switches 10f offset from the body of the other circuit breaker 10c and/or fused switch 10f. One starter and/or feeder $F_1$, $F_2$ resides closer to the front cover 11 than another to allow for conductors 30 from the other to pass across and/or under to the wireway W, which may be particularly suitable for compact units.

FIGS. 3A, 3B, 4A and 4B illustrate that the two starters and/or feeders $F_1$, $F_2$ can be held side-by-side but with one closer to the cover 11 and with the respective doors 22 being coplanar. These arrangements allow conductors 30 from one of the feeders/starters, either $F_1$ or $F_2$ to pass behind or in front of another, e.g., $F_2$ or $F_1$. FIGS. 3A and 4A illustrate the wireway W on the right side and the left starter and/or feeder, $F_1$, residing closest to the front cover 11. FIGS. 2B and 3B illustrate the wireway W on the right and the right starter and/or feeder $F_2$ residing closest to the front cover 11 and the left starter and/or feeder $F_1$ residing closer to the back of the unit 10 (closer to the power stabs 13). The doors 22 can be held at the same location (coplanar), aligned at a front the unit. One feeder and/or starter, shown as the left starter and/or feeder $F_1$ in FIG. 3B and the right feeder $F_2$ in FIG. 4A, can have a longer drive shaft 25l than the other.

The shaft 25 (FIG. 8A, 8B) can be attached or keyed to a drive gear 42, 42' that drives a rack gear 46, 46' (FIG. 9A, FIG. 9B), directly or indirectly, to translate rotational motion to linear motion (where a rotary handle 20 is used).

The longer shaft 25l an have a length that is between about 3 inches to about 5 inches. The longer shaft 25l can be between 1.5-10 times (e.g., 1.5×-10×) the length of the other shaft, e.g., about 1.5×, about 2×, about 3×, about 4×, about 5×, about 6×, about 7×, about 8×, about 9× or about 10× the length of the other shaft 25. Typically the longer shaft is between about 1.5× to about 5× the length of the shorter shaft. The longer shaft 25l can be configured to have a primary shaft body attached to an extension that provides the additional length or may be a unitary body.

It should be noted that the wireway W may be on the left side rather than the right side. Also, the right side starter and/or feeder $F_1$ may be positioned further away from the cover 11 and use the longer shaft 25l with the left side feeder $F_2$ positioned closer to the cover 11, as discussed above for right side wireways W.

As shown in FIGS. 3B and 4A, the two starter and/or feeders $F_1$, $F_2$ can be positioned so that their adjacent sides of respective primary bodies 10b are closely spaced apart a lateral distance $D_2$. Exemplary $D_2$ spacings are discussed below.

Figure 4B:
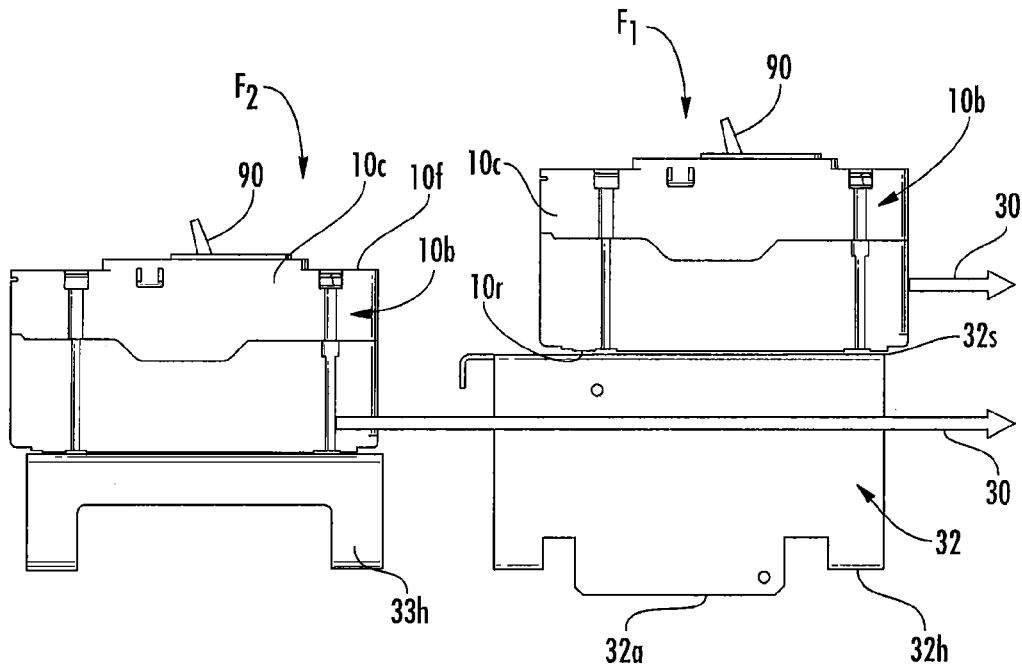
FIG. 4B is an enlarged partial view of the feeders having the arrangement shown in FIG. 4A schematically illustrating a conductor configuration to a vertical wireway according to embodiments of the present invention.
Figure 5A:
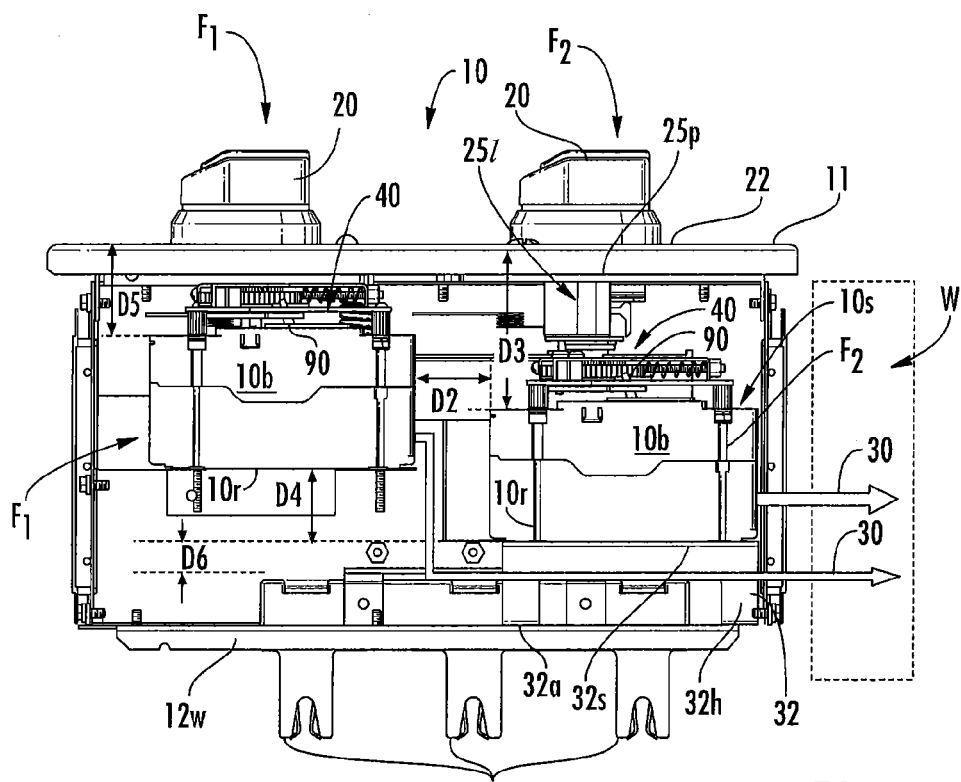
FIG. 5A is a top view of the unit shown in FIG. 3A illustrating another exemplary offset arrangement of the dual starters and/or feeders inside the unit according to embodiments of the present invention.
Figure 5C:
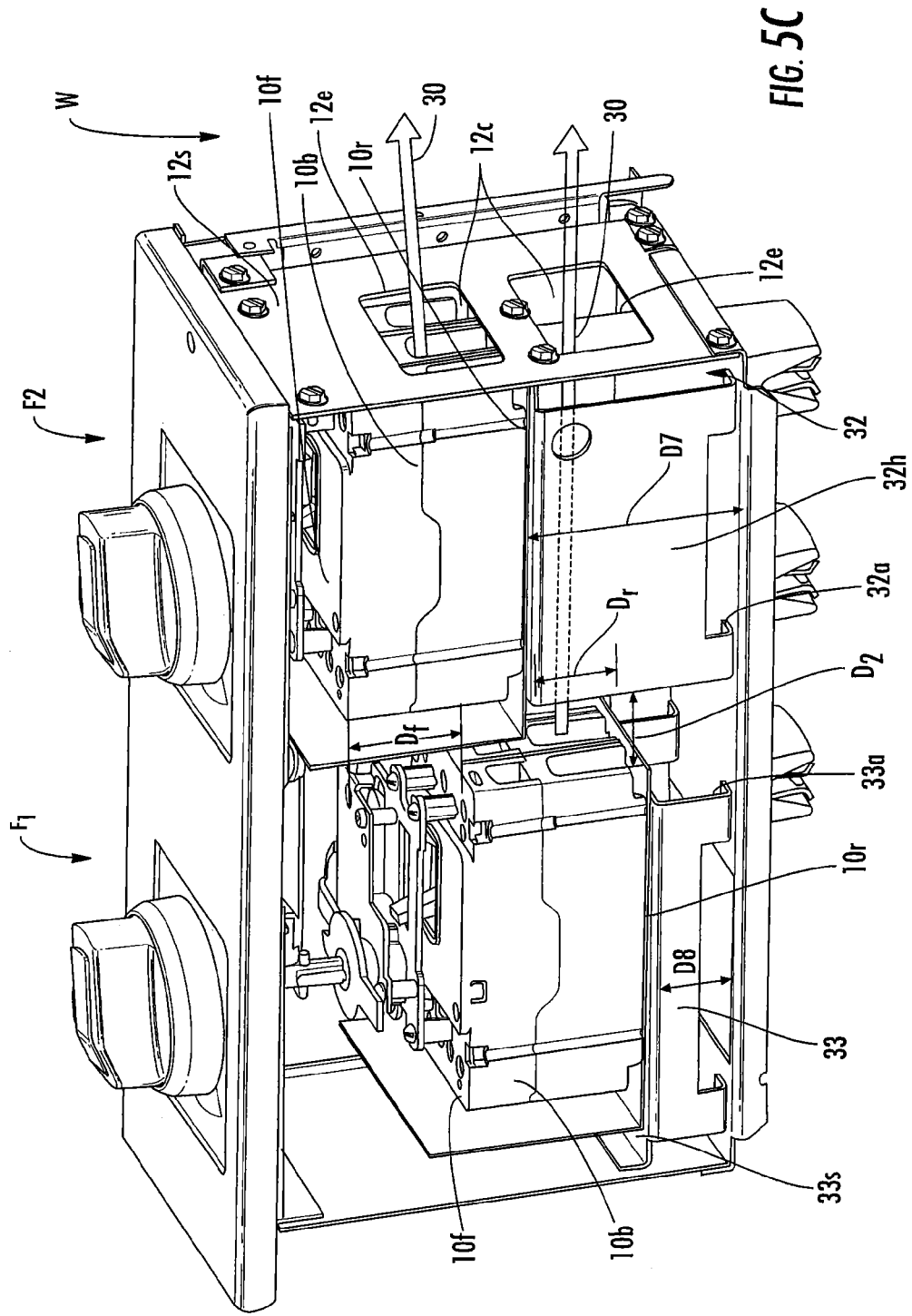
FIG. 5C is a bottom perspective view of the unit shown in FIG. 2B illustrating another exemplary offset arrangement of the dual configuration according to embodiments of the present invention.

As shown in FIGS. 4A and 4B, for the offset configuration of the adjacent feeders $F_1$, $F_2$ in a respective unit 10, the spacing can be configured to allow the wires/conductors 30 of the front-most feeder to extend straight across the other to the vertical wireway W (load side), through a wireway space 32 without requiring any bends (e.g., a "no bend" configuration). Thus, the front 10f of one starter or feeder, shown as $F_2$ in FIG. 4A, can reside a distance "$D_1$" behind the back or rear 10r of the other feeder, shown as $F_1$. FIGS. 3B and 5C illustrate the forward most feeder or starter (right side) $F_2$ can be positioned so that its front surface 10f is a distance "$D_f$" forward of the front surface 10f of the other feeder or starter $F_1$. The offset can have a distance $D_r$ between adjacent rear surfaces 10r of the adjacent left side feeder or starter $F_1$. The conductors 30 from the left side feeder/starter $F_1$ can go straight across and behind the right side feeder/starter $F_2$ to the vertical wireway W.

$D_1$ and $D_2$ extend between a load side and a line side. The distance $D_1$ and $D_2$ can be the same or different. The spacing criteria corresponds to the NEC code for service entrance electrical spacing, e.g., 1 inch through air at 600V. Insulating barriers can reduce the physical spacing distance. FIGS. 5A and 5B illustrate an insulating barrier B under $F_1$, e.g., the trap under $F_1$.

As shown in FIGS. 3B, 4A and 5A, the feeder positioned furthest away from the panel 11 can be positioned so that its forward or front surface 10s is a distance "$D_3$" away from the panel 11 (measured at either the most forward section or the slightly shorter side section). This distance may vary depending on right or left side wireways W and unit rating, for example. Typically, the distance $D_3$ is between about 1-4 inches, such as about 1 inch, about 2 inches, about 3 inches, about 4 inches and any value therebetween. In some embodiments, the wireway W is 4 inches deep.

As shown in FIGS. 3B, 5A, 5B, 5C and 6A, the unit 10 can have an internal cross-wireway space 32 that can be provided as a horizontally extending space inside a mounting bracket 32h. The mounting bracket 32h can have a planar support surface 32s to hold the back of the feeder $F_1$ or $F_2$. The mounting bracket 32h can have an opposing segment 32a that attaches directly or indirectly to an outer wall of the unit 10.

FIGS. 5A and 5B illustrate an alternate configuration of a unit 10 with the offset dual feeders $F_1$, $F_2$. Again, one feeder (shown as $F_2$) is positioned further back in the unit 10 than the other and each of the respective doors 22 can be coplanar. In this embodiment, the conductors 30 of one feeder (shown as $F_1$) can have an "L" shaped bend as the conductors 30 turn from the feeder primary body 10b to extend straight across an internal wireway space 32 behind the other feeder $F_2$.

The lateral spacing distance $D_2$ between the two feeders and/or starters $F_1$, $F_2$ can be at least one inch if separated by only air. The spacing can be less if an insulating barrier material or lower voltage rating (under 600V), for example. In some embodiments, $D_2$ can be between about 1 inch to about 6 inches, more typically between about 1.5-6 inches, such as about 1.5 inches, about 2 inches, about 2.5 inches, about 3 inches, about 3.25 inches, about 3.5 inches, about 4 inches, about 4.5 inches, about 5 inches, about 5.5 inches and about 6 inches. In some embodiments, $D_2$ can be between about 3-6 inches, for example. The bending guidelines for #1 AWG wire between breakers for L-shaped bends is 3 inches. This configuration may also allow left side breaker customer wiring.

The forward surface $10f$ of the forward starter or feeder (shown as $F_1$ in FIG. 5A and $F_2$ in FIG. 5C) can reside a distance $D_5$ away from the panel 11 (and respective door) while the forward surface $10f$ of the other feeder can reside a distance $D_3$ from the panel 11 (and respective door 22), where $D_3 > D_5$. The rear surface $10r$ of one of the starter and/or feeder bodies $10b$ can reside a distance $D_4$ in front of the other rear surface $10r$. This distance is typically between about 1-3 inches, more typically about 1.5 inches.

The cross-wireway space 32 can be sufficient to allow the conductors 30 to extend across to the wireway W a distance $D_6$ in back of the rear surface of the feeder or starter thereat (shown as $F_2$ in FIG. 5A). This distance is typically between about 1-4 inches. In some embodiments, $D_6$ extends to about a full depth to the exit window $12e$ in the sidewall $12s$. $D_6$ may be about 3.5 inches. The conductor exit window $12e$ can be configured as a cutout $12c$ in the sidewall $12s$ and may be one large window or first and second spaced apart windows.

While it is preferred that the doors 22 of each feeder or starter $F_1$, $F_2$, are coplanar in the same vertical plane, one may be stepped to recede a distance into the unit but still allow the handle 20 to be manually accessible and externally visible with suitable electric shielding to provide a continuous barrier to the front panel 11 (not shown).

FIGS. 5B and 5C illustrate that the forward feeder (shown as $F_1$ in FIG. 5B) can be held by a mounting bracket 33. As shown in FIG. 5B, the bracket 33 can have a length $D_8$ and the other mounting bracket $32h$ defining the conductor pathway 32 can have a different length $D_7$ (e.g., height in the figures). FIG. 5B shows that the bracket 33 can have a larger length $D_8$ than the length $D_7$ of the mounting bracket $32h$ while FIG. 5C illustrates the opposite configuration (the length is shown as a height dimension in the orientation in the drawing, but is a length in the depth dimension in an operative position in the unit). The bracket 33 can have an open interior gap space or through channel $33g$ and may be formed of bent or stamped sheet metal, for example. The mounting bracket 33 can have a planar surface $33s$ and a segment $33a$ that attaches to the rear wall $12w$ of the unit housing 12.

Figure 6A:
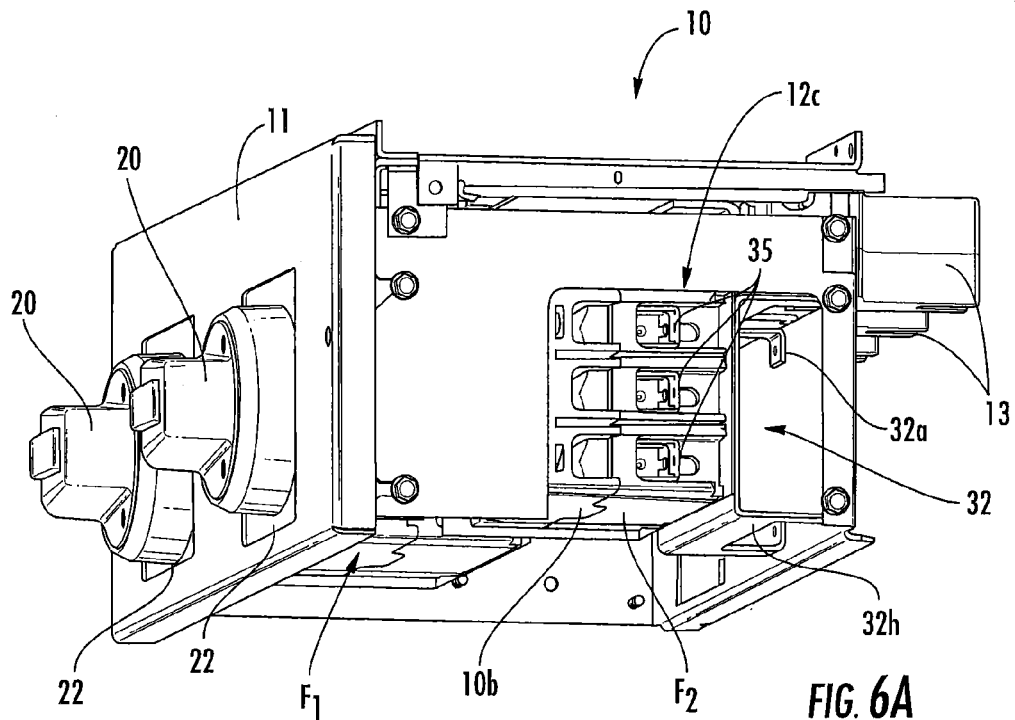
FIG. 6A is a side perspective view of a unit illustrating an exemplary offset arrangement of the dual feeders (right side feeder back, left side feeder forward) with breaker load side terminals according to embodiments of the present invention.
Figure 6B:
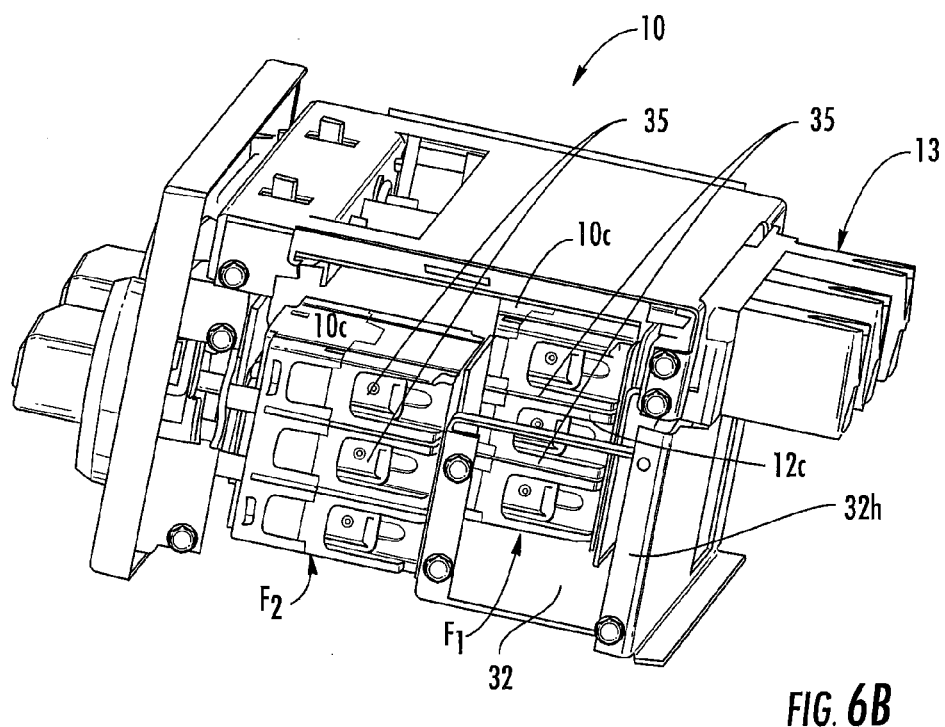
FIG. 6B is a side perspective view of a unit with a different offset arrangement of the dual feeders (left side feeder back, right side feeder forward) with breaker load side terminals according to embodiments of the present invention.
Figure 7:
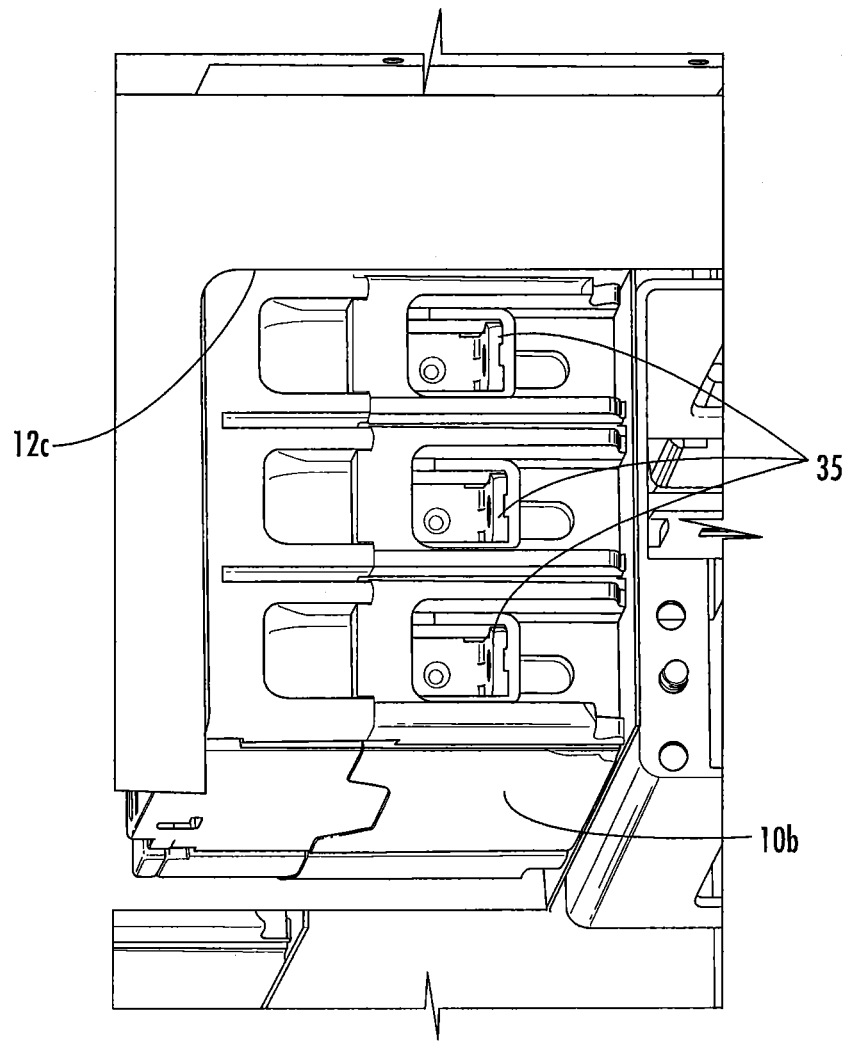
FIG. 7 is an enlarged partial side view of the unit shown in FIG. 6A according to embodiments of the present invention.

FIGS. 6A, 6B and 7 illustrate a side of the unit 10 with the sidewall of the housing 12 having a cutout $12c$ to allow conductors 30 from one feeder to extend out to the wireway W alongside, but in front of, conductors 30 from the other feeder, one set of conductors extending through the internal wireway space 32, to wireway W. The primary body $10b$ of the starters or feeders $F_1$, $F_2$ can include (breaker) load side terminals 35 on the same side (e.g., the right side for a right side wireway W) with to accommodate respective customer or factory installed conductors 30.

As shown in FIGS. 8A-8D and 9A, for example, the operator mechanism 40 can include a drive gear 42, a pinion gear 44, and an operator rack gear 46. Generally summarized, the handle 20 via shaft 25 is keyed to interface with the rotary drive gear 42. Drive gear 42 interacts mechanically with pinion gear 44. Pinion gear 44 also interacts with the linearly translating moveable rack 46. Consequently, as the handle 20 rotates, because it is interlocked with the drive gear 42, the drive gear 42 rotates on its axis, thus rotating the pinion gear 44, which then linearly moves the rack 46. The rack 46 then moves the operator slider 52 over operator base 50 which moves to trip lever 90 as the handle 20 moves. The operator base 50 can be stationary and affixed to an inner housing. The base 50 can have a horizontally oriented elongate slot $50s$ that is aligned with a smaller slot $52s$ in the operator slider 52. The slots $50s$, $52s$ cooperate to hold lever 90 (toggle) and when the operator slider with slot $52s$ moves to the right (based on rotation of the handle 20, for example), this moves the lever 90 to the right along the path defined by slot $50s$. It is noted that the lever 90 (also known as a toggle) can move laterally as shown or the circuit breaker or fuse switch may be oriented to move vertically.

The base 50 and cooperating slider 52 can be provided in different sizes with different length and width slots $50s$ to accommodate smaller and larger toggles or switches 90 associated with frames of different sizes/amperage rating.

Figure 8A:
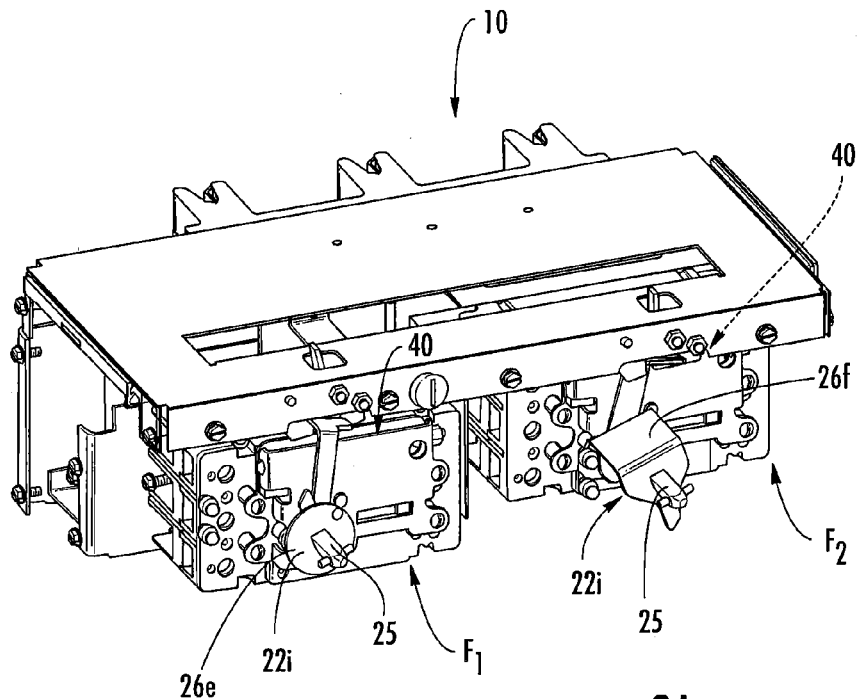
FIGS. 8A and 8B are front perspective views of an exemplary dual feeder unit shown without the front cover, doors and handles to illustrate exemplary operating mechanisms according to embodiments of the present invention.
Figure 8B:
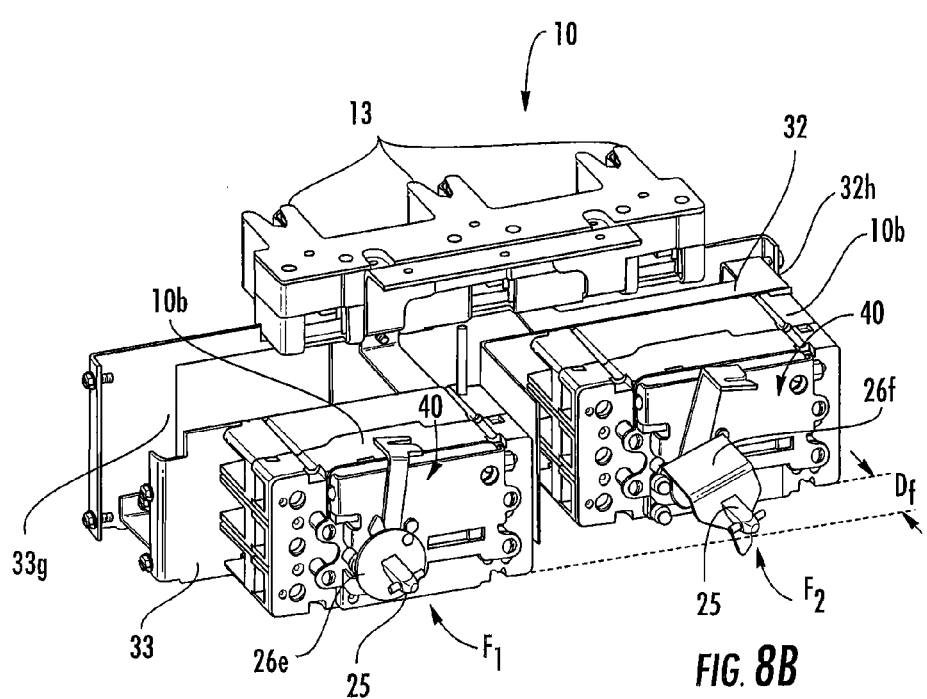
Figure 8C:
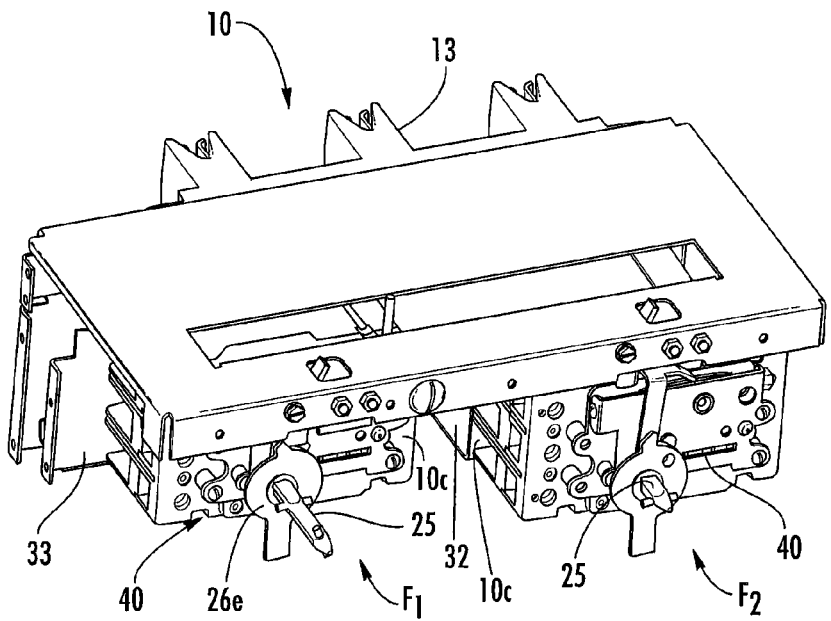
FIGS. 8C and 8D are front perspective views of an exemplary dual feeder unit shown without the front cover, doors and handles to illustrate exemplary operating mechanisms according to embodiments of the present invention.
Figure 8D:
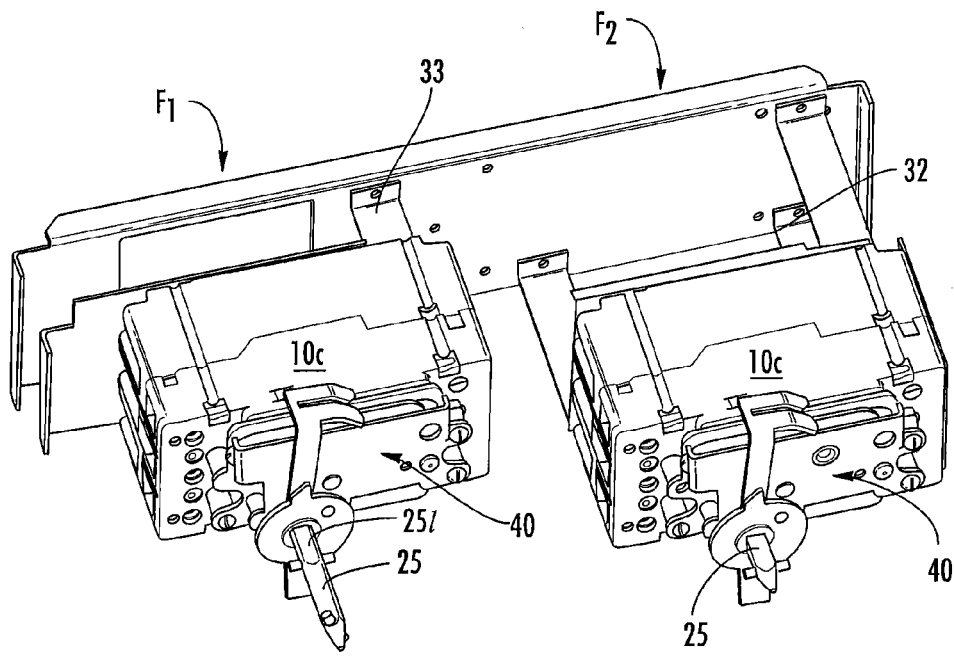

FIGS. 8A and 8B also illustrate that the shaft 25 of one starter or feeder $F_1$ can have a different configuration from the other starter or feeder $F_2$. That is, the door interlock $22i$ can comprise a circular escutcheon $26e$ for the forward feeder (shown as $F_2$) to interface with the door 22 to provide the door interlock $22i$. The door interlock $22i$ for the other feeder (shown as $F_2$) can have a planar inwardly extending surface $26f$ that rises above the shaft 25 and that can be configured to cooperate with the door 22 to provide the door interlock $22i$. The door 22 can have an interlock defeat $22d$ (FIG. 4A) that can be secured by a screw $22s$, shown as in an upper right hand side of the door in FIGS. 4A, 5B.

FIG. 8B also illustrates the front of a primary body of one starter and/or feeder $F_2$ can reside a distance $D_f$ behind the front of a primary body of the other starter and/or feeder $F_1$, although in an adjacent, side-by-side orientation.

FIG. 9B illustrates an exemplary fused disconnect switch for a bucket $10f$ with the drive gear $42'$ in communication with a rack gear 46 that moves up and down or orthogonal to the rack gear $46'$. This movement can engage and move a fuse switch lever or input 260 up and down for ON/OFF operation. Exemplary fuses are FUSETRON™ 600V Class RK5 fuses (BU-SB13729) available from Cooper Bussmann Company, St. Louis, Mo. However, the design is flexible and can accommodate other fuses including those in different classes.

Referring again to FIG. 9A, for units 10 with circuit breakers $10c$, the operating mechanism 40 can also include a trip assist spring 43 held by pin 41 that is in communication with the rack gear 46 to assist the handle 20 to move to a consistent OFF position when the circuit breaker is tripped. For additional description of an example of an operator mechanism and components thereof, see, e.g., U.S. Provisional Application Ser. No. 61/890,495 and U.S. patent application Ser. No. 14/501,969, the contents of which are hereby incorporated by reference as if recited in full herein.

The drive gears 42, $42'$ of the fuse and circuit breaker $10f$, $10c$, respectively, can have the same configuration (e.g., be the same component) or may have different dimensions or configurations. In some embodiments, the drive gear 46 for the operator mechanism 40 as well as for the fuse operator (disconnect) mechanism $40'$ can have gear teeth that extends less than a full circumference of the respective gear, typically the gear teeth $42t$ extend for between about 9-180 degrees, more typically about 90 degrees of the circumference of the drive gear 42, $42'$ as shown in FIGS. 9A and 9B.

Figure 10A:
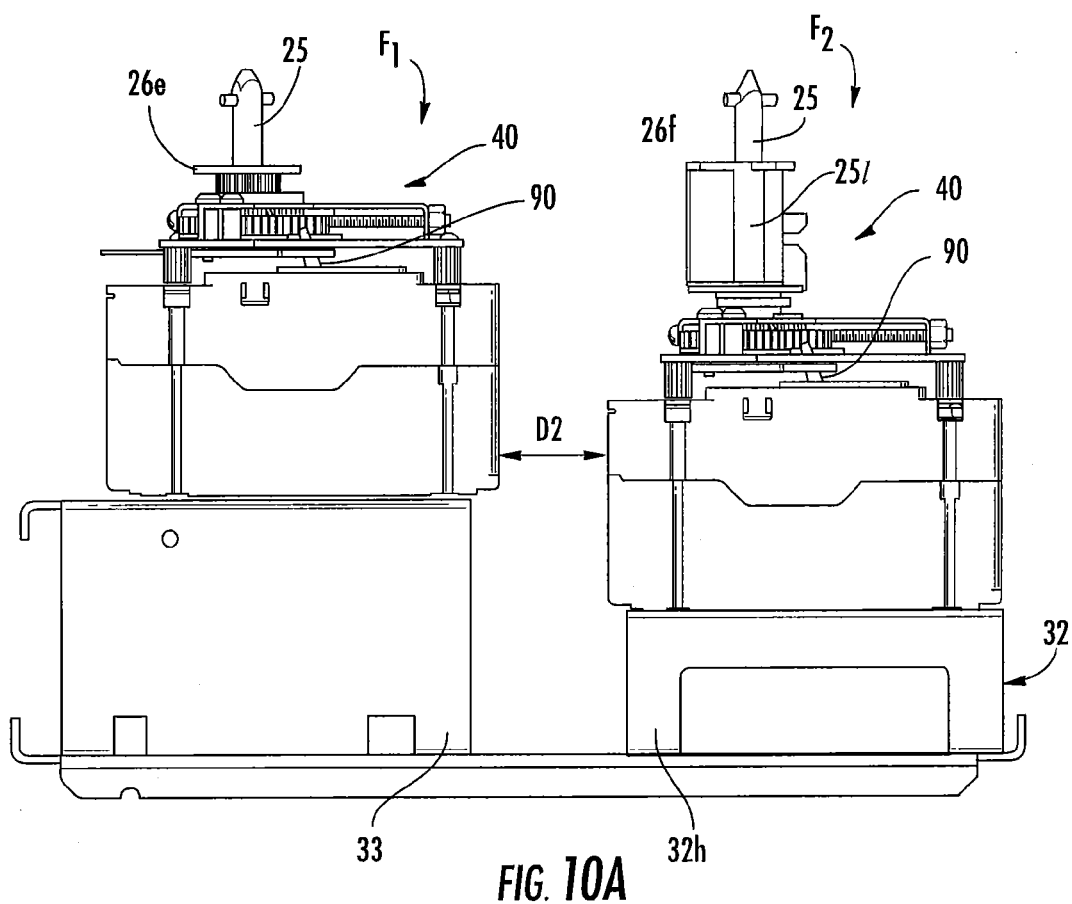
FIG. 10A is a bottom view of an exemplary unit with dual feeders according to embodiments of the present invention.
Figure 10B:
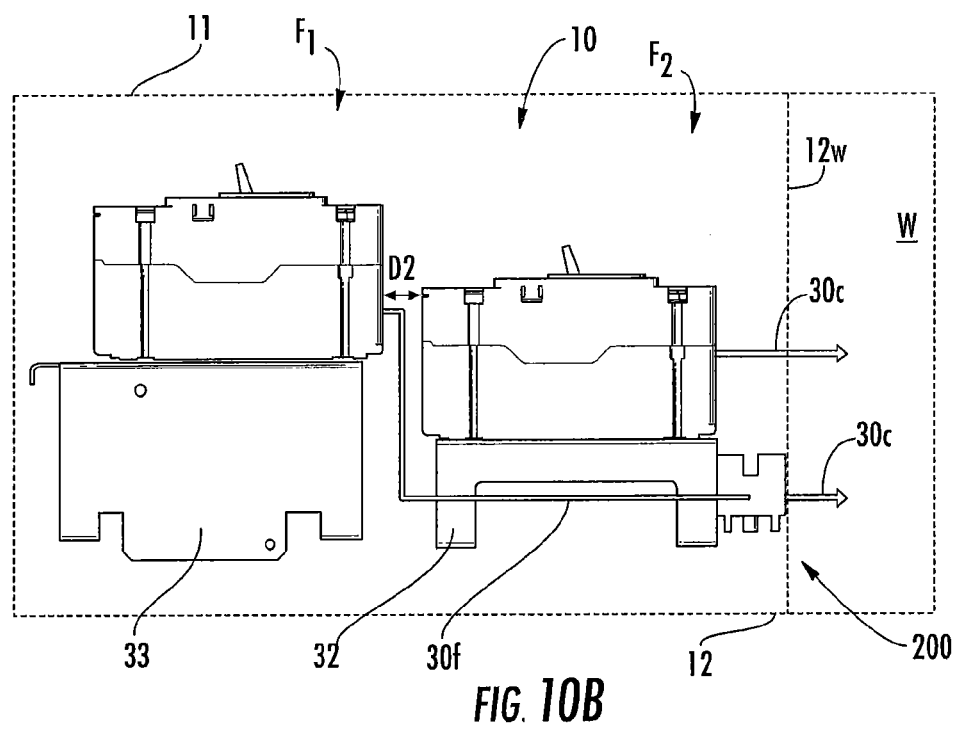
FIG. 10B is a top or bottom view of an exemplary unit with an onboard terminal block adjacent one of the feeders according to embodiments of the present invention.

FIGS. 10A and 10B illustrate exemplary lateral spacing $D_2$ for embodiments of the invention. In FIG. 10A, the spacing $D_2$ can be larger than that of FIG. 10B to comply with NEC guidelines. In the embodiment shown in FIG. 10B, a factory wire $30f$ can be pre-installed and provided with the unit 10, attached to a terminal block 200 that is onboard the unit 10 adjacent one side of the unit, shown as adjacent the right side feeder $F_2$, so as to be accessible for onsite installation. The right side breaker/feeder $F_2$ can be moved laterally inward, relative to the configuration shown in FIG. 10A, for example, to provide space alongside one side of the unit to accommodate or fit the terminal block 200 inside the housing 12 of the 10. Customer wire 30c can connect to the terminal block 200, thus to the left side feeder $F_1$. Additional customer wire can connect directly to the adjacent right side feeder, $F_2$.

Figure 11A:
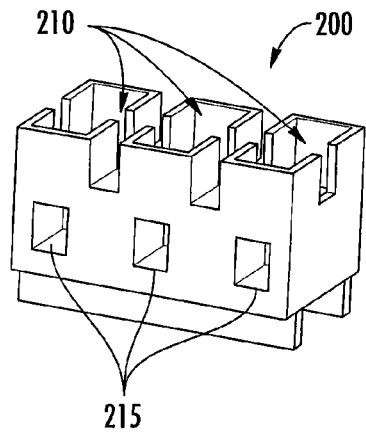
FIGS. 11A and 11B are side perspective views of the terminal block shown in FIG. 10B according to embodiments of the present invention.
Figure 11B:
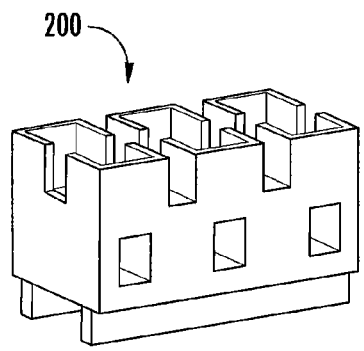
Figure 11C:
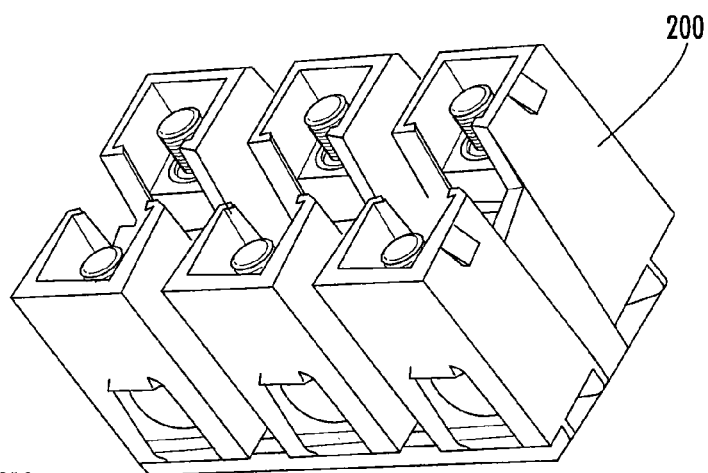
FIG. 11C is a top perspective view of the terminal blocks shown in FIGS. 11A and 11B with wire attachment members according to embodiments of the present invention.
Figure 12A:
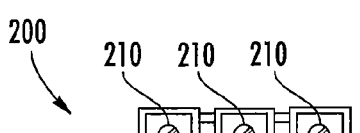
FIG. 12A is a top view of an exemplary terminal block suitable for the onboard terminal block shown in FIG. 10B according to embodiments of the present invention.
Figure 12B:
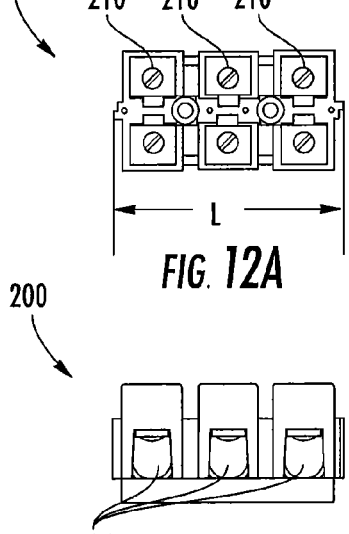
FIG. 12B is a side view of the terminal block shown in FIG. 12A.
Figure 12C:
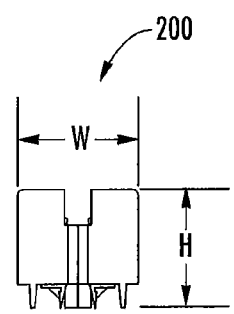
FIG. 12C is an end view of the terminal block shown in FIG. 12A.

FIGS. 11A, 11B and 12A-12C illustrate an exemplary configuration of a terminal block 200. The terminal block 200 can be small, e.g., having a height dimension H of between about 1-2 inches, typically about 1.5 inches. The terminal block 200 can have a length dimension L of between about 3-5 inches, with three conductor connections 210 closely spaced apart and aligned. The terminal block 200 can have a width dimension between about 1.5-3 inches, typically about 1.75 inches. The input and output connections 210 are symmetrically spaced apart with adjacent (neighboring) connections 210 being about 1 inch apart. The terminal block 200 can be a Bussmann terminal block of suitable rating. For example, as shown in FIG. 11C, in some particular embodiments, the terminal block 200 can be sized and configured with channels to accommodate a largest wire size for a 125A frame breaker.

In operation, the orientation of the rotary handle 20 can provide a visual indication of the conduction status of the operator disconnect, e.g., breaker 10c or ON/OFF switch for the fused disconnect switch 10f.

In some embodiments, if the handle 20 is in a generally horizontal position, i.e., with the center lever 20L straight across the front of the circuit breaker as shown in FIG. 1, this orientation can be the OFF position and can be visually used as an indication that the contacts of the circuit breaker are open and that current is blocked. If the handle 20 is rotated from the orientation shown in FIG. 1, e.g., rotated 90 degrees (typically clockwise from the orientation in FIG. 1), then an indication is given that the circuit contacts are closed and current is being conducted. The breaker trip position can be at about 45 degrees mid-point between ON and OFF. However, as noted above, the handles 20 may have other configurations and are not required to be rotating handles.

Figure 13:
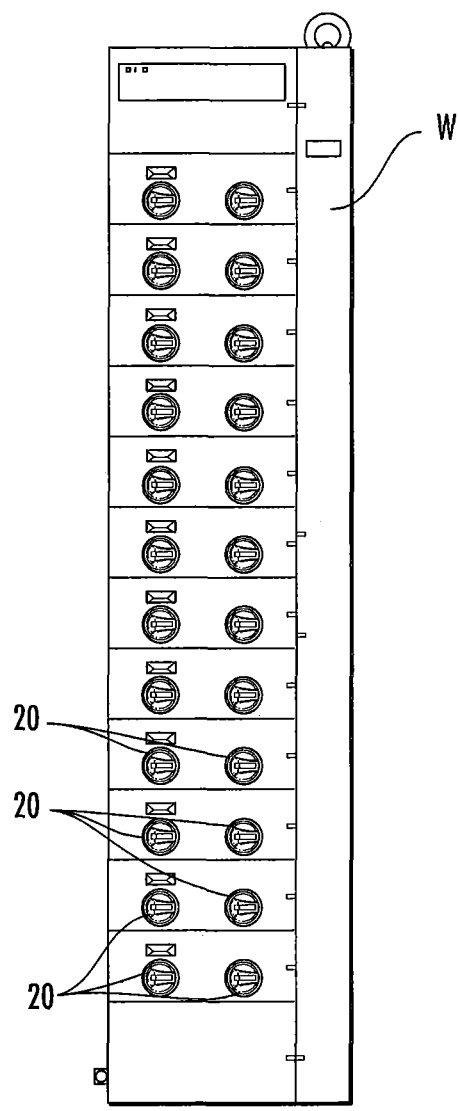
FIG. 13 is a front view of an exemplary multi-unit Motor Control Center cabinet according to embodiments of the present invention.

As shown in FIG. 13, in some embodiments, when mounted in the MCC cabinet 100, the handles 20 can all substantially, if not totally, vertically align and have the same trip and/or ON/OFF positions.

Similarly, an MCC cabinet 100 can be configured so the bucket units 10 all have the same handle 20 in the same position when mounted in the MCC cabinet 100 and the units 10 can have the same ON/OFF operative positions for both fused disconnect switches and circuit breaker units 10f, 10c, respectively.

FIG. 13 illustrates an example of an MCC cabinet 100 that can support multiple units 10 of various types 10f, 10c and/or of various defined sizes, typically from between 1X to 12X. Thus, the units 10 can have a compact, visually aesthetic or "clean" appearance provided by aligned handles 20 irrespective of breaker or fused disconnect switch type 10c, 10f and irrespective of frame size (breaker size). The same external handle 20 can be configured to accommodate different size gears 40, sliders 52 and different size frames (different size toggles or switches 90) while providing an external similar aesthetic visual appearance with a common look of the OFF and ON positions of the handles 20 of units 10 of various types.

The units 10 can have visual indicia 10i (FIG. 9A) that indicates whether it is a fused switch or circuit breaker type unit 10f, 10c, respectively. The visual indicia can include a label, icon, color, and the like. In some embodiments, handles 20 can have visual indicia that distinguishes the type and/or size (rating) of the unit. The visual indicia can be provided with a stripe or different contrast colors for a protruding lever, knob, handle or "T" or the underlying portion of the handle that is externally visible.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A bucket assembly, comprising:
a unit housing having a front;
a first external handle facing the front of the housing and attached to a first inwardly extending shaft;
a second external handle facing the front of the housing and attached to a second inwardly extending shaft and being laterally spaced apart from the first external handle;
a first starter or feeder held in the unit housing in communication with the first handle; and
a second starter or feeder held in the unit housing in communication with the second handle, wherein the first starter or feeder is held in the unit housing adjacent to but offset from the second starter or feeder, in a front to back direction, to reside closer to the front of the unit housing than the second starter or feeder.

2. The bucket assembly of claim 1, wherein the first and second starters or feeders are right and left side starters or feeders that have primary bodies that reside laterally spaced apart a distance of between about 1-3 inches, measured from adjacent inwardly facing sides extending in the front to back direction.

3. The bucket assembly of claim 1, wherein the first and second starters or feeders have primary bodies that reside spaced apart in the front to back direction so that a rear surface of one is a distance of between about 1-3 inches from a front surface of the other.

4. The bucket assembly of claim 1, wherein the first starter or feeder is a right side starter or feeder and the second starter or feeder is a left side starter or feeder, each with load side terminals on a right side thereof, and wherein the unit housing has a right sidewall that has an open portion allowing an exit access path for conductors from the first and second starters or feeders to a right side vertical wireway.

5. The bucket assembly of claim 1, wherein the first starter or feeder is a right side feeder and the second starter or feeder is a left side starter or feeder, and wherein the left side starter or feeder resides closer to the front of the unit housing than the right side starter or feeder, and wherein an inwardly extending first shaft of the right side starter or feeder has a length that is between about 1.5 times to about 5 times greater than the second shaft of the left side starter or feeder.

6. The bucket assembly of claim 1, wherein the first starter or feeder is a right side feeder and the second starter or feeder is a left side starter or feeder, and wherein the right side starter or feeder resides closer to the front of the unit housing than the left side starter or feeder, and wherein the shaft of the left side starter or feeder has a length that is between about 1.5 times to about 5 times greater than the shaft of the right side starter or feeder.

7. The bucket assembly of claim 1, wherein the first and second starters or feeders have respective primary bodies of substantially the same size, and wherein the primary bodies are laterally offset from each other a distance of between 0.5-3 inches and offset in the front to back direction between about 0.5-5 inches, and wherein the first and second feeders or starters are held by a respective bracket attached to a rear wall of the unit housing, one of the brackets defining a wireway space extending laterally behind one of the primary bodies to define a straight conductor passage to a vertical wireway.

8. The bucket assembly of claim 1, wherein the first and second starters or feeders have load side terminals facing a vertical wireway, wherein the first starter or feeder is held in the unit housing by a first bracket attached to a rear surface of a primary body of the first starter or feeder, and wherein the first bracket is configured to define an open laterally extending space behind the first starter or feeder that defines an internal laterally extending wireway for conductors attached to the second starter or feeder to a vertical wireway.

9. The bucket assembly of claim 1, wherein the handles are external rotary handles having a defined ON position and OFF position associated with conduction and non-conduction, and wherein an inner portion of the first and second shafts cooperably engage a respective first and second operator mechanism that then engage a respective lever or switch of the first and second starters or feeders, and wherein the first and second operator mechanisms comprise a rotatable drive gear attached to the shaft that engages a rack gear that linearly moves an operator slider to move the lever or switch.

10. The bucket assembly of claim 1, wherein the first and second starters or feeders comprise molded case circuit breakers.

11. The bucket assembly of claim 1, wherein the first shaft and the second shaft have different lengths and one is between about 1.5 to about 5 times greater than the other.

12. The bucket assembly of claim 1, wherein the unit housing has a centerline that extends in the front to back direction, aligned with a center power stab extending out a back of the unit housing, wherein the first and second starters or feeders have primary bodies, one that resides in a right side and one that resides in a left side of the unit housing, and wherein an inward facing wall of the right side primary body resides closer to the center power stab than an inward facing wall of the left side primary body.

13. The bucket assembly of claim 1, wherein the first starter or feeder is a left side starter or feeder and the second starter or feeder is a right side starter or feeder and each has respective primary bodies, wherein the first and second handles are rotatable handles, wherein the second shaft is longer than the first shaft and the left side feeder resides further away from the front of the unit housing than the right side feeder, wherein the bucket assembly further comprises a first bracket attached to a back of the unit housing and the primary body of the first starter or feeder and a second bracket attached to the back of the unit housing and the primary body of the second starter or feeder, and wherein the second bracket defines a laterally extending wireway space in the unit housing extending behind the second starter or feeder for conductors attached to the primary body of the first starter or feeder to a right side vertical wireway, and wherein the second bracket has a greater depth dimension in the front to back direction than the first bracket.

14. A compact bucket assembly comprising:
a unit housing;
right and left side molded case circuit breakers;
right and left side rotary external handles held by the unit housing that rotate based on conduction and non-conduction status of a respective circuit breaker in the unit housing, and
first and second inwardly extending shafts, the first shaft attached to the right side rotary handle and the second shaft attached to the left side rotary handle, wherein one shaft is longer than the other shaft by between about 1.5 times (1.5×) to about five times (5×).

15. The assembly of claim 14, wherein the molded case circuit breakers have substantially the same size and shape, and wherein the right side circuit breaker resides closer to the front of the unit housing than the left side circuit breaker, residing on a bracket that is attached to a rear panel of the unit housing.

16. The assembly of claim 15, wherein the circuit breakers have primary bodies that reside spaced apart in the front to back direction so that a rear surface of one is a distance of between about 1-3 inches from a front surface of the other, and wherein conductors from the left side circuit breaker travel straight across the unit housing behind the right side circuit breaker to a right side vertical wireway.

17. The assembly of claim 14, wherein the right side and left side circuit breakers have a lever facing a front of the unit housing, and wherein the right side circuit breaker resides on a bracket that is attached to a rear panel of the unit housing and places the right side circuit breaker closer to the front of the unit housing than the right side circuit breaker.

18. The assembly of claim 17, wherein conductors from the left side circuit breaker travel behind the right side circuit breaker to a right side vertical wireway through a straight conductor path extending though the bracket, and wherein the right side and left side circuit breakers have a lever facing a front of the unit housing.

19. A motor control center (MCC) cabinet with vertically stacked buckets, at least one bucket having right and left side external handles with respective right and left inwardly extending shafts in communication with a respective lever or switch of either a fused disconnect switch or a circuit breaker, wherein one of the right or left shafts is between about 1.5 times to about ten times longer than the other to position the associated lever or switch behind the other, in a front to back direction of the bucket.

20. The MCC cabinet of claim 19, wherein the cabinet comprises a right side vertical wireway, wherein the at least one bucket having the first and second handles comprises first and second molded case circuit breakers having substantially the same size and shape and adjacent inner sidewalls are laterally spaced apart a distance that is between about 1-6 inches, and further comprises conductors attached to a terminals of a right side of the left side circuit breaker and that travel behind the right side circuit breaker to the right side vertical wireway.

* * * * *